May 6, 1924.

A. COWEN

CLAMP FOR LEAKY PIPE JOINTS

Filed June 7, 1923

1,493,107

Inventor
Arthur Cowen.

By Lacey & Lacey, Attorneys

Patented May 6, 1924.

1,493,107

UNITED STATES PATENT OFFICE.

ARTHUR COWEN, OF KOKOMO, INDIANA.

CLAMP FOR LEAKY PIPE JOINTS.

Application filed June 7, 1923. Serial No. 644,005.

*To all whom it may concern:*

Be it known that I, ARTHUR COWEN, a citizen of the United States, residing at Kokomo, in the county of Howard and State of Indiana, have invented certain new and useful Improvements in Clamps for Leaky Pipe Joints, of which the following is a specification.

The present invention relates to a device for easily and quickly repairing leaky pipe joints and more particularly leakage at a flange, a T, or an elbow, where leaking most often occurs on a pipe.

It is a well known fact that it is extremely difficult to stop such a pipe leak without removing the T or elbow where the leak occurs. With the present device, there is no necessity of removing any portion of the joint, but only to apply the sundry parts making up the device of the present invention, the work only taking a few minutes.

In the accompanying drawing, one embodiment of the invention is illustrated; and—

Figure 1:
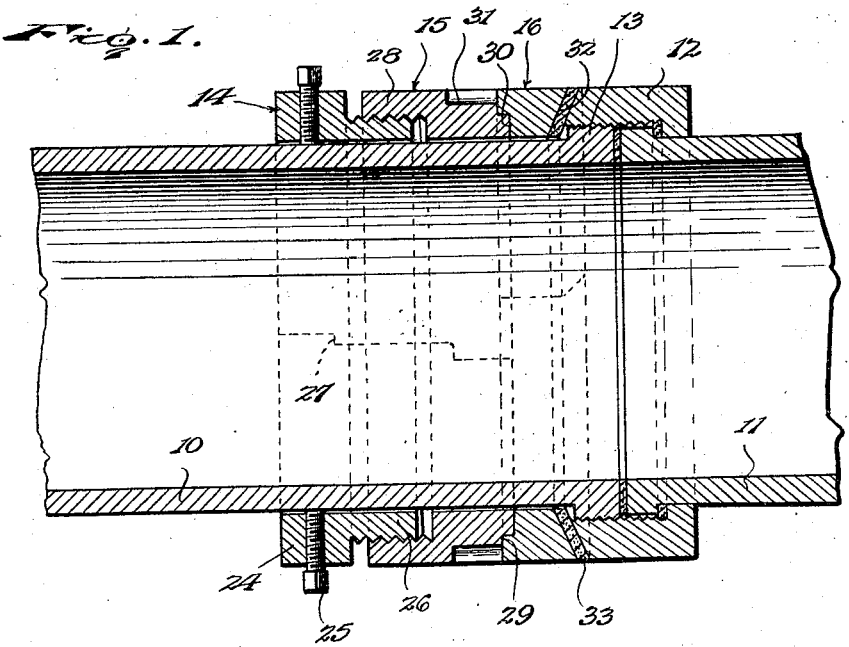
Figure 1 is a longitudinal section of a pipe joint with a clamp in position.

In the drawing, reference numerals 10 and 11 represent two pipes which are held together by the usual clamping flange 12. As indicated in Figure 1, the flange 12 is threaded as at 13 at one end of the pipe 10. In case a leak occurs between the flange and end of pipe 10, the clamp forming the subject matter of the present invention is applied on the left side of this flange, as seen in Figure 1.

Figure 2:
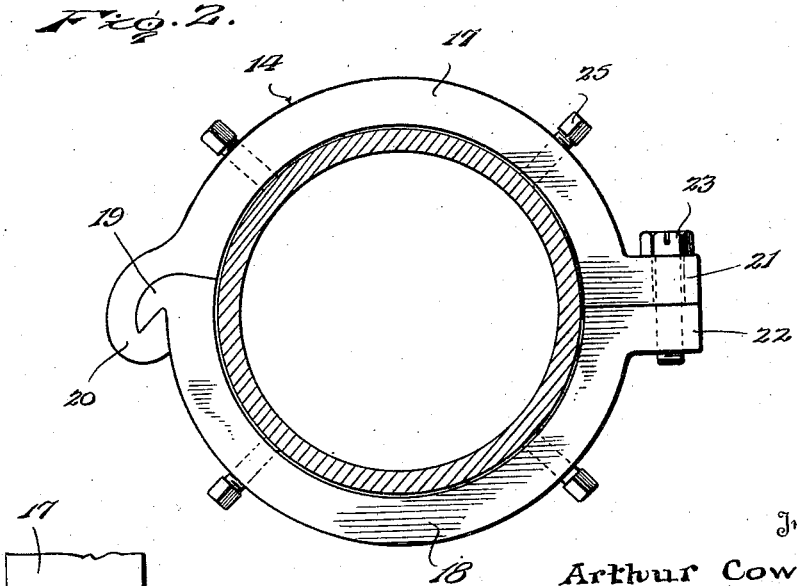
Figure 2 is a transverse section of Figure 1.

The clamp consists of three rings or annular members 14, 15 and 16, which all have a slightly larger inside diameter than the pipe 10 to which the clamp is going to be applied. The ring 14, which may be termed "the abutment member" consists of two mating halves 17 and 18, which at one end are provided with a coupling consisting of a lip 19 on the lower half 18 of the abutment member adapted to engage with a depending jaw 20 from the other half 17 of the abutment member, as best seen in Figure 2. At a substantially diametrically opposite point of the abutment member, the two halves 17 and 18 are each provided with a lug 21 and 22 respectively, projecting outwardly in radial direction from the abutment member and adapted to receive a tightening bolt 23 for drawing the two halves firmly together.

Figure 3:
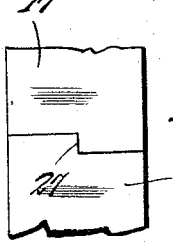
Figure 3 is a fragmentary elevation of one of the rings constituting the clamp as seen from the inside.

At the left hand end of the abutment member 14, as seen in Figure 1, an annular collar 24 is provided and adapted to receive clamping bolts 25 threaded in the collar and projecting through the same on the inside of the abutment member, so that the abutment member may be firmly tightened around the pipe 10, as indicated in Figure 1. The threaded shank 26 extends in the right hand direction from the collar 24 as seen in this figure. In order to properly lock the two halves 17 and 18 together, a shoulder 27 is formed in transverse direction between the two halves as indicated in Figure 3.

The intermediary member 15 of the clamp, which may properly be termed "adjusting ring" is similarly made in two halves, as already described in connection with the abutment member 14 and has a threaded portion 28 adapted to engage the shank 26 on the abutment member. At the opposite end, the adjusting ring 15 is furnished with an annular rabbet 29 adapted to engage in a corresponding rabbet 30 in the clamping member 16, which may be properly termed "gland." Around the periphery of the adjusting ring 15 are furnished wrench notches 31, by means of which the adjusting ring may be turned upon the threaded shank 26 by the use of a wrench in order to advance the adjusting ring against the gland 16.

The gland 16 is also made in halves in the same manner as the abutment member 14 and the adjusting ring 15, and is preferably furnished with a beveled surface 32 at its right hand end, as seen in Figure 1, in case the flange 12 has a correspondingly beveled surface facing the gland 16. Should the flange have a perpendicular surface, the gland will still be the same.

Reference numeral 33 represents the gasket or packing which may be made of leather, rubber, hemp, or else garlock may be used, and having a shape suitable to fill the space between the gland 16 and the flange 12.

It will now be evident that each of the three members 14, 15 and 16, when engaged by means of their lips 19 and jaws 20 on the one side and the tightening bolts 23 on the opposite side, that they completely enclose the pipe 10, upon which they are going to be secured.

In applying the clamp, the abutment member 14 is first opened by unscrewing the bolt 23, whereupon the two parts 17 and 18 thereof are laid around the pipe 10 and again secured together by means of a tightening bolt 23. At this time, the abutment member is perfectly loose on the pipe and can be pushed along the same in any direction. The abutment member is now secured on the pipe at the proper distance from the flange 12 by means of the clamping bolts 25, as indicated in Figures 1 and 2, and with the shank 26 facing the flange 12. The adjusting ring 15 is then opened and positioned around the pipe 10 in the same manner, and the threaded portion 28 thereof is arranged to be screwed onto the shank 26 of the abutment member 14. The adjusting ring 15 is thereupon turned upon the shank 26 by means of a wrench engaging in the notches 31 until the adjacent end faces of the two members 14 and 15 abut.

The packing 33 is then laid against the beveled side of the flange 12 in sufficient thickness to take care of the leak when pressure is applied. The gland 16 is thereupon opened by unscrewing its bolt 23 and placing the lip 19 into the jaw 20, and the parts are laid around the pipe 10 and the bolt 23 drawn up tightly. It will be evident that both the gland 16 and the adjusting ring 15 fit perfectly loose around the pipe 10, as when the bolts are drawn up, there is still a space between the pipe and these members. The gland 16 is now brought up closely against the packing 23, whereupon the adjusting ring 28 is backed off the threaded shank 26 by turning it by means of a wrench as already described. The rabbets 29 and 30 furnished at the adjacent faces of the clamp members 15 and 16 will then engage, and after advancing the adjusting ring 15 sufficiently, it will push the gland 16 tightly up against the packing 33, which will then be squeezed tightly between the beveled faces of the gland 16 and the flange 12 thereby completely stopping any leak at this point.

It is evident that this clamp can be applied very quickly on a leaking pipe and that no change whatsoever in the pipe or the joint is necessary.

Having thus described the invention, what is claimed as new is:

1. A pipe joint clamp comprising an abutment member, an adjusting member and a gland member, said abutment member and adjusting member having threaded engagement, and means for securing said abutment member upon a pipe or the like.

2. A pipe joint clamp comprising an abutment member, an adjusting member and a gland member, said abutment member and ajusting member having threaded engagement, means for securing said abutment member upon a pipe or the like, and interengaging rabbets upon said adjusting member and said gland member permitting rotation between said two members.

3. A pipe joint clamp comprising an abutment member, an adjusting member and a gland member, said abutment member and adjusting member having threaded engagement, means for securing said abutment member upon a pipe or the like, and interengaging rabbets upon said adjusting member and said gland member permitting rotation between said two members, said gland member having a forward annular surface adapted to receive a packing element.

4. A pipe joint clamp comprising an abutment member, an adjusting member and a gland member, said abutment member and adjusting member having threaded engagement, means for rigidly securing said abutment member upon a pipe or the like, interengaging rabbets upon said adjusting member and said gland member permitting rotation between said two members, said gland member having a forward annular surface adapted to receive a packing element, and said members each being made in interengaging halves and elements on said halves for tightly holding them together.

5. A pipe joint clamp comprising an abutment member, an adjusting member and a gland member, said abutment member and adjusting member having threaded engagement, means for rigidly securing said abutment member upon a pipe or the like, interengaging rabbets upon said adjusting member and said gland member permitting rotation between said two members, said gland member having a forward annular surface adapted to receive a packing element, said members each being made in interengaging halves and elements on said halves for tightly holding them together, and the halves of said abutment member being provided with transversely engaging shoulders.

In testimony whereof I affix my signature.

ARTHUR COWEN. [L. S.]